Oct. 28, 1941.   F. L. HOESS   2,260,621
MACHINE FOR FORMING SHEET METAL SECTIONS
Filed Aug. 19, 1939   2 Sheets-Sheet 1
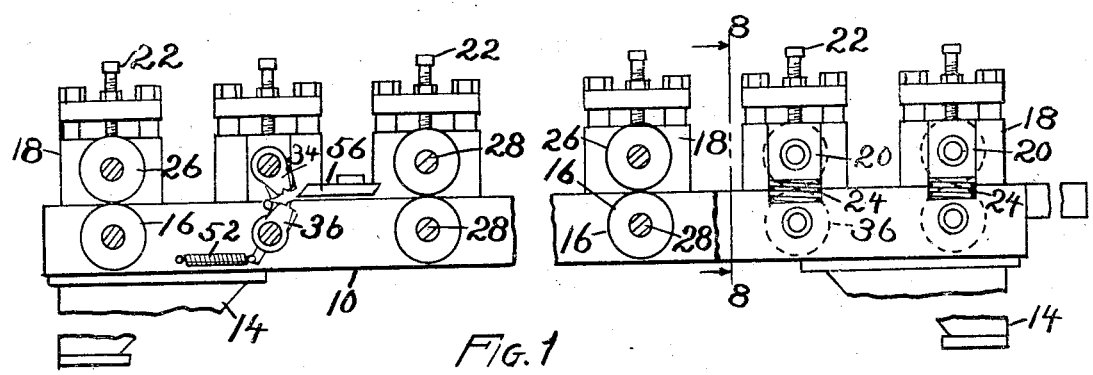
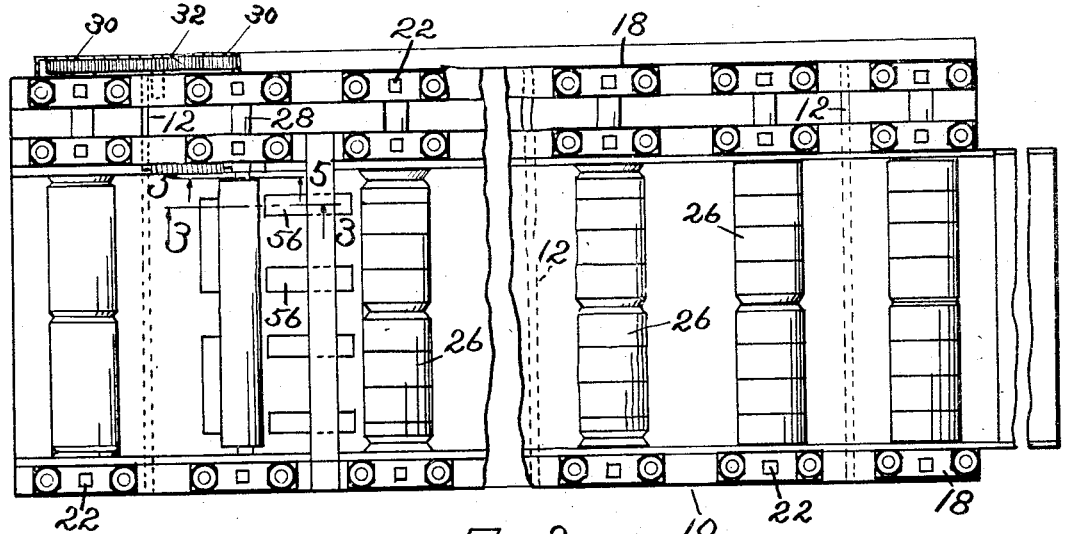
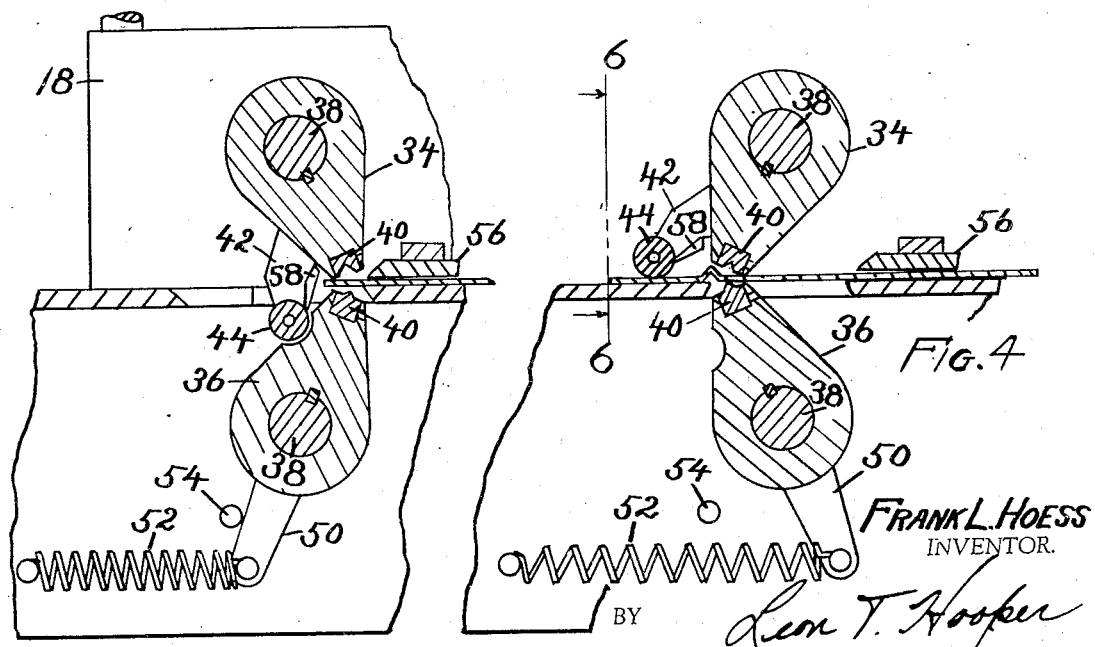
Frank L. Hoess
INVENTOR.
BY Leon T. Hooper
ATTORNEY.

Oct. 28, 1941. F. L. HOESS 2,260,621
MACHINE FOR FORMING SHEET METAL SECTIONS
Filed Aug. 19, 1939 2 Sheets-Sheet 2
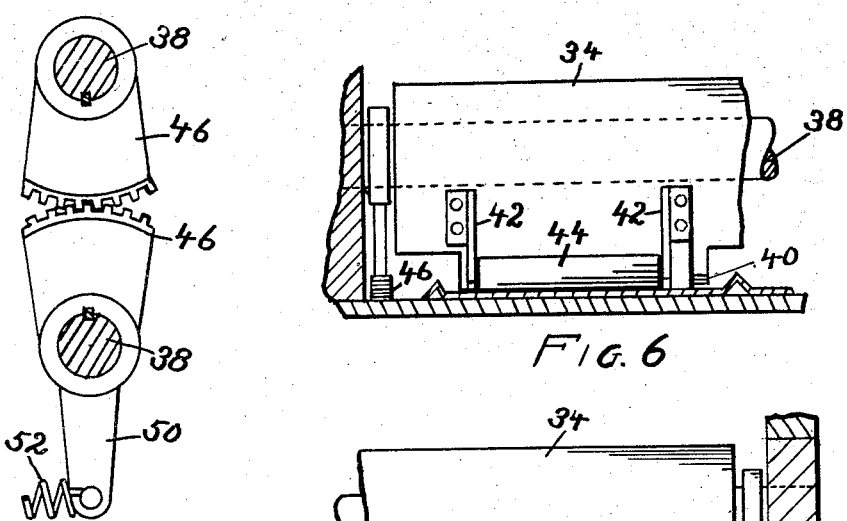
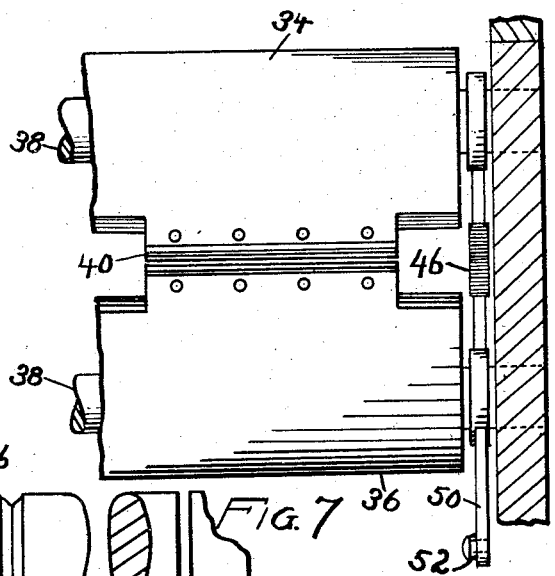
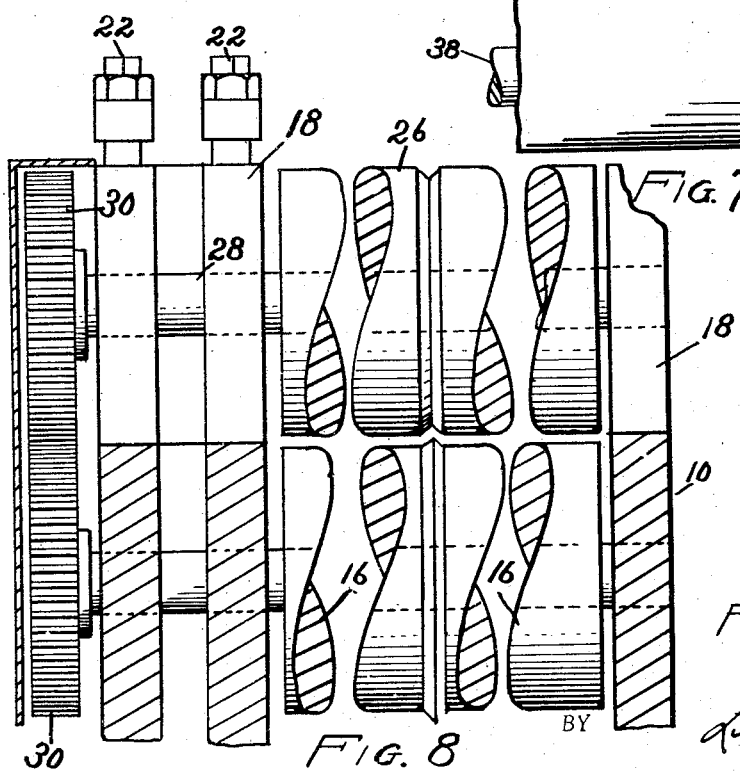
Frank L. Hoess
INVENTOR.
BY Leon T. Hooker
ATTORNEY.

Patented Oct. 28, 1941

2,260,621

UNITED STATES PATENT OFFICE 2,260,621

MACHINE FOR FORMING SHEET METAL SECTIONS

Frank L. Hoess, Hammond, Ind.

Application August 19, 1939, Serial No. 290,942

14 Claims. (Cl. 153—77)

This invention relates to an improved machine which has for its principal object the provision of means for forming and embossing pieces, sections or strips of sheet metal both longitudinally and transversely as they are passed through the machine. The pieces of metal formed and embossed on the machine are adapted to be used as covering members in the construction and repair of buildings. The pieces are ready to use as they come from the machine. Trimming or cutting is not required.

Another object of advantage and importance of the machine of this invention resides in the provision of means for utilizing a portion of the piece of material passing through the machine for operating the embossing mechanism.

Still another and further object of advantage and importance resides in the provision of means for forming, where it is so desired, certain longitudinal deformations in the material in advance of forming other deformations.

An additional object of advantage and importance of the improved machine of this invention is the provision of means for economically producing uniformly formed and embossed pieces of sheet metal in a single operation.

Additional objects of advantage and importance will become apparent, some of which are hereinafter more fully described, will become apparent as the following detailed description progresses, reference being had to the accompanying drawings, wherein—

Fig. 1 is a side elevational view of a machine, parts thereof being broken away, which embodies the invention.

Fig. 2 is a top plan view thereof.

Fig. 3 is a fragmental section taken on line 3—3 of Fig. 2, looking in the direction indicated by the arrows, and shows the embossing mechanism in receiving position.

Fig. 4 is a similar sectional view and shows the embossing mechanism in discharge position.

Fig. 5 is a fragmental section taken on line 5—5 of Fig. 2, looking in the direction indicated by the arrows.

Fig. 6 is a fragmental sectional view taken on line 6—6 of Fig. 4, looking in the direction indicated by the arrows.

Fig. 7 is an elevational view of a fragmental portion of the embossing mechanism.

Fig. 8 is a vertical section taken on line 8—8 of Fig. 1, looking in the direction indicated by the arrows.

As shown in the drawings:

The reference numeral 10 indicates generally the bed or base of the improved machine of this invention. The bed 10 is preferably constructed of three parallel members, as is best shown in Fig. 2. The parallel members of the bed 10 are maintained in proper position by suitable cross members 12. The upper surface of the bed 10 forms a support and guide for material passing through the machine. Suitable legs or supporting members 14 are attached to the bottom of the bed 10.

Positioned at spaced intervals and spanning the distance between two of the parallel members forming the bed 10 is a plurality of shaft supported rolls 16. Each shaft 28 upon which a roll 16 is positioned is journaled in each of the three parallel members of the bed 10.

Secured to the upper surface of each parallel member of the bed 10 and in paired alignment with the rolls 16 is a plurality of upper roller supporting members 18.

Adjustably positioned in each supporting member 18 is an upper roller bearing member 20. Adjustment of the bearing member 20 is made through the adjustment screws 22.

In the preferred embodiment of the device, an expansion spring 24 is interposed between the bed 10 and each upper bearing member 20. The spring 24 urges the bearing members 20 and rollers, which may be positioned therein, upwardly. The separation of the upper roller 26 from the lower roller 16 greatly facilitates feeding material through the machine.

Mounted in the upper bearing members 20, directly above each lower roller 16, is an upper roller 26. Each upper and lower roller comprises a pair of co-acting metal forming members. Each shaft 28, upon which an upper 26 or lower roller 16 is positioned, may project beyond the outermost parallel member, as is best shown in Figs. 2 and 8.

Positioned on the outwardly projecting end of each shaft 28 is a gear 30. The gears 30 on each pair of upper and lower shafts 28 are in mesh and, consequently, turn in unison, one clockwise and the other anti-clockwise.

Positioned between the spaced apart lower gears and thus completing a continuous gear train from one end of the machine to the other end thereof, is a plurality of idler gears 32. The idler gears are adapted to transmit power from one lower gear 30 to the next adjacent lower gear 30. Accordingly, movement of one gear moves all gears, and rollers associated therewith in unison.

It will be apparent that various types of forming and shaping rolls may be employed on the improved machine. In the embodiment shown in the drawings, the rolls are adapted to form pieces of sheet metal to be used in overlapping aligned arrangement to form a ribbed roof covering. However, deformations adapted to be interlockingly joined with like members may be formed on the lateral edges of the pieces.

It will also be apparent that the ridges or ribs formed on the material as it passes through the machine shown, project upwardly. However, it will be apparent that the formations may project downwardly or the edges of the material may be crimped or turned as desired by merely changing the die portions of the rolls.

Positioned in the machine at the discharge end of the forming rolls 16 and 26 is a pair of co-acting members 34 and 36. The member 34 is positioned above the line of travel of material passing through the machine and the member 36 is positioned below said line of travel, as is best shown in Figs. 3 and 4. The members 34 and 36 are each mounted on a separate shaft, designated by the reference numeral 38. The members 34 and 36 are adapted to describe an arc from a starting position which is at an angle to a vertical line drawn through the axes on which the members move, as shown in Fig. 3, to a discharge position at an angle on the opposite side of said line, as shown in Fig. 4.

Removably secured to the members 34 and 36 are complementary embossing dies 40. The dies 40 are adapted to be operably associated as the members 34 and 36 move from one side of the above mentioned vertical line to the other. As the dies move from the starting to the discharge position, they are adapted to engage and emboss material positioned therebetween. As the dies 40 reach the discharge end of their travel, their progress is arrested but the material continues to pass through the separated dies.

Operably associated with the member 36 by means of brackets 42 are rollers 44. The length of each roller 44 is restricted to allow them to contact the surface of the metal between the ridges or deformations thereon as the material passes through the machine. The length of the roll may be increased or decreased, as desired.

Positioned on each shaft 38, intermediate one end of the members 36 and the adjacent parallel member, is a segmental gear member 46. The segmental gear members 46 are operably associated one with the other, as is best shown in Fig. 5, and being keyed to their respective shafts 38 it is apparent that the shaft 38, the members 34 and the members 46 will move in unison.

Operably secured to one segmental gear member 46 by means of an extension arm 50 is a spring member 52. The spring member 52 is adapted to move the members 34 and 36 from the discharge position shown in Fig. 4 to the receiving or starting position shown in Fig. 3. A stop 54 is preferably employed to prevent the members from swinging beyond a given point.

Positioned above the line of travel of material passing through the machine and intermediate the embossing mechanism and the next adjacent forming roll is a plurality of guides 56 preferably spaced to contact the flat surface of the material passing through the machine. However, it will be apparent that where it is so desired, the guides may be positioned to engage the ridges or deformed portions of the material.

In the operation of the machine, material is passed from right to left of the structure, as shown in Figs. 1 and 2. As the material enters the fast pair of rolls, formations of the central ridge begins. As the material progresses into the machine, the side edges of the material are drawn inwardly by the formation of the central ridge. Consequently, the central ridge is completed before any formation is started at the edges of the material. It will be apparent that this order may be reversed and the deformations adjacent the edges of the material be formed first. The ridges or deformations are not formed simultaneously.

As the material passing through the machine is discharged from the last forming roll, it is pushed under the guides 56 which prevent buckling and into the space between the embossing members 40, as is best shown in Fig. 3. The leading edge of the material then contacts the adjustment members 58 on the brackets 42, and moves the embossing members 40 attached to the members 34 and 36 in an arc across a vertical line through their axes. As the material moves forward, the leading edge thereof forces the bracket 42 and the roller 44 upwardly. The upward movement of the rollers 44 forces the embossing members to the discharge end of their path of travel. The rollers 44, by engagement with the surface of the material, are adapted to maintain the members 34 and 36 in the discharge position shown in Fig. 4 until the rear end of the material has passed beneath the roller 44. The spring 52 then contracts and moves the members 34 and 36 into the position shown in Fig. 3.

It will be apparent from the foregoing that the transverse embossing means are adapted to swing back and forth or oscillate across a median line through the axes of the rockable shafts with which they are associated. The complementary embossing members emboss each piece of material as they swing forward during the progress of the material through the machine. It will be apparent that the machine may be driven by any suitable means.

It is to be noted that the location of the transverse embossing on the material may be changed by adjusting the member 58.

It will be apparent from the foregoing, that herein is provided an improved machine which is especially adapted to transversely emboss and longitudinally deform material in a continuous operation as it passes therethrough. And, also, that such embossing or deformation may be at various locations on the material.

It will also be apparent from the foregoing that herein is provided an improved machine in which the material passing through the machine activates and operates the transverse embossing mechanism. Moreover, provision is made to prevent any possible buckling or warping of the material due to excess strain caused by it being pushed through the embossing elements.

It will be apparent to those skilled in the art to which the device appertains, that numerous changes and alterations in construction and design may be made all without departing from the spirit or scope of this invention. Accordingly, it is understood that the patent granted hereon is not to be limited to the preferred embodiment here disclosed nor in any other manner except as necessitated by the terminology of the appended claims when given the range of equivalents to which they may be entitled.

I claim as my invention:

1. In a machine of the class described, the combination with a support, of guiding and supporting means thereon for sections of sheet material, including a set of driven rolls incorporated with said guiding and supporting means for feeding the sections therealong, a pair of members mounted above and below the path of movement of the sections and swingable from one side of a median line to the opposite side thereof on axes at right angles to the direction of movement of the sections, said members being provided with complementary embossing elements arranged to engage each section during movement thereof and emboss it, and means for swinging said members.

2. In a machine of the class described, the combination with a support, of guiding and supporting means thereon for sections of sheet material, including a set of driven rolls incorporated with said guiding and supporting means for feeding the sections therealong, a pair of members mounted above and below the path of movement of the sections and swingable from one side of a median line to the opposite side thereof on axes at right angles to the direction of movement of the sections, means for swinging said members in the direction in which the sections move, said members being provided with complementary elements arranged to engage each section during movement thereof and emboss it, and separate means for swinging said members in the opposite direction.

3. A machine as claimed in claim 2 wherein the swinging of said members in each direction is controlled by each section.

4. In a machine of the class described, the combination with a support, of guiding and supporting means for sections of sheet material including a set of rolls for feeding the sections therealong, a pair of members mounted above and below the path of movement of the sections and swingable from one side of a median line to the opposite side thereof on axes disposed at right angles to the direction of movement of the sections, said members being operatively connected for simultaneous movement in either direction, a device carried by one of said members in the path of movement of the sections and arranged when engaged by the advancing front end of each section to swing said members from the rear side of said median line to the forward side thereof, said members being provided with complementary elements arranged to emboss each section during the swinging movement of said members, and means for swinging said members in the opposite direction.

5. In a machine of the class described, the combination with a support, of guiding and supporting means for sections of sheet material including a set of rolls for feeding the section therealong, a pair of members mounted above and below the path of movement of the sections and swingable from one side of a median line to the opposite side thereof on axes disposed at right angles to the direction of movement of the sections, said members being operatively connected for simultaneous movement in either direction, a device carried by one of said members in the path of movement of the sections and arranged when engaged by the advancing front end of each section to swing said members from the rear side of said median line to the forward side thereof, said members being provided with complementary elements arranged to emboss each section during the swinging movement of said members, said device being arranged to ride on each section after it has been embossed to hold said members in operated position, and a spring connected to one of said members and arranged to swing them in the opposite direction after the rear end of each section has fed past said device.

6. In a machine of the class described, the combination with a support, of guiding and supporting means thereon for sections of sheet material, including a set of driven rolls incorporated with said guiding and supporting means for feeding the sections therealong, a pair of members mounted above and below the path of movement of the sections and swingable from one side of a median line to the opposite side thereof on axes at right angles to the direction of movement of the sections, said members being provided with complementary embossing elements arranged to engage each section during movement thereof and emboss it, spring tension means normally tending to swing said members to the rear side of said median line in position to receive each section between them, and a device carried by one of said members and disposed in the path of movement of the sections when said members are in position to receive a section between them, whereby the advancing front end of each section operates through said device to swing said members to the opposite side of said median line.

7. In a machine of the class described, the combination with a support, of guiding and supporting means thereon for sections of sheet material, including a set of driven rolls incorporated with said guiding and supporting means for feeding the sections therealong, a pair of members mounted above and below the path of movement of the sections and swingable from one side of a median line to the opposite side thereof on axes at right angles to the direction of movement of the sections, said members being provided with complementary embossing elements arranged to engage each section during movement thereof and emboss it, spring tension means normally tending to swing said members to the rear side of said median line in position to receive each section between them, and a device carried by one of said members and disposed in the path of movement of the sections when said members are in position to receive a section between them, whereby the advancing front end of each section operates through said device to swing said members to the opposite side of said median line, said device being arranged to ride each section as it feeds forward, whereby said section holds said members in operated position until its rear end passes said device and permits said members to swing rearwardly under the influence of said spring tension means.

8. In a machine of the class described, the combination with a support, of guiding and supporting means thereon for sections of sheet material, a pair of members mounted above and below the path of movement of the sections and swingable from one side of a median line to the opposite side thereof on axes at right angles to the direction of movement of the sections, means for connecting said members together for simultaneous movement in either direction, said members being provided with complementary embossing elements arranged to engage each section during movement thereof and emboss it, a device carried by one of said members and arranged to be engaged by each section to operate said members, means normally tending to swing said members to the rear side of said median line, and means for successively feeding sections of sheet material between said members.

9. In a machine of the class described, the combination with a support, of guide means thereon for sections of sheet material, a pair of spaced standards, upper and lower rock shafts mounted in said standards above and below the path of movement of the sections, a pair of members fixed to said shafts and swingable to either side of a plane cutting the axes of said shafts, the outer ends of said members being arranged to traverse arcs which substantially intersect the path of movement of the sections, complementary elements on the outer ends of said members arranged to emboss each section as said members swing from the rear side of said plane to the forward side thereof, means for connecting said members together for simultaneous movement in either direction, one of said members being provided with a device arranged in the path of movement of each section when said members are positioned at the rear side of said plane, whereby each section as it feeds forward swings said members to the forward side of said plane, means for returning said members to the rear side of said plane, and means for feeding sections of material along said guide means and between said members.

10. In a machine of the class described, the combination with a support, of sets of rolls forming passes for sections of material and having complementary elements for embossing the sections longitudinally as the sections move between said rolls, a pair of members arranged to oscillate on axes parallel to said sets of rolls for embossing the sections transversely, means for connecting the members together for simultaneous movement in either direction, means for swinging said members in a direction opposite to that in which the sections feed, a device carried by one of said members and arranged to be engaged and operated by each section, whereby the section is embossed by said members as the section feeds therebetween, and means for driving certain of said sets of rolls to feed the sections between said sets of rolls and said embossing members.

11. In a machine of the class described, the combination with a support, of sets of rolls forming passes for sections of material and having complementary elements for embossing the sections longitudinally from end to end as the sections move between said rolls, a pair of members arranged to oscillate on axes parallel to said sets of rolls for embossing each said section transversely intermediate its front and rear ends, means for connecting said members together for simultaneous movement in either direction, spring tension means normally tending to swing said members in a direction opposite to that in which the sections feed, a device carried by one of said members and arranged to be engaged and operated by each section, whereby the section is embossed by said members as the section feeds therebetween, and means for driving certain of said sets of rolls to feed the sections between said sets of rolls and said embossing members.

12. In a machine of the class described, the combination with a support, of guiding and supporting means thereon for sections of sheet material, a pair of members mounted above and below the path of movement of the sections and swingable from one side of a median line to the opposite side thereof on axes at right angles to the direction of movement of the sections, means for connecting said members together for simultaneous movement in either direction, said members being provided with complementary embossing elements arranged to engage each section during movement thereof and emboss it, a device carried by one of said members and arranged to be engaged by each section to operate said members, means normally tending to swing said members to the rear side of said median line, means positioned above the path of movement of the material and closely adjacent the upper swingable embossing member to bar the upward movement of material being forced through the co-acting embossing members, and means for successively feeding sections of sheet material between said members.

13. In a machine of the class described, the combination with a support, of guiding and supporting means thereon for sections of sheet material, a pair of members mounted above and below the path of movement of the sections and swingable from one side of a median line to the opposite side thereof on axes at right angles to the direction of movement of the sections, means for connecting said members together for simultaneous movement in either direction, said members being provided with complementary embossing elements arranged to engage each section during movement thereof and emboss it, a device carried by one of said members and arranged to be engaged by each section to operate said members, means normally tending to swing said members to the rear side of said median line, a plurality of guide members positioned above the path of movement of the sections and intermediate the embossing members and the next adjacent roll, and means for successively feeding sections of sheet material between said members.

14. In a machine of the class described, the combination with a support, of guiding and supporting means thereon for sections of sheet material, a pair of members mounted above and below the path of movement of the sections and movable from one side of a median line to the opposite side thereof on axes at right angles to the direction of movement of the sections, means for connecting said members together for simultaneous movement in either direction, said members being provided with complementary embossing elements arranged to engage each section during movement thereof and emboss it, a device carried by one of said members and arranged to be engaged by each section to operate said members, means normally tending to move said members to the rear side of said median line, and means for successively feeding sections of sheet material between said members.

FRANK L. HOESS.